United States Patent
Shiba et al.

(10) Patent No.: US 6,685,178 B2
(45) Date of Patent: Feb. 3, 2004

(54) LINEAR GUIDING APPARATUS FOR MACHINE TOOL

(75) Inventors: Kazuhiro Shiba, Numazu (JP); Takao Date, Shizuoka-Ken (JP)

(73) Assignee: Toshiba Kikai Kabushiki Kaisha, Tokyo-To (JP)

( * ) Notice: Subject to any disclaimer, the term of this patent is extended or adjusted under 35 U.S.C. 154(b) by 0 days.

(21) Appl. No.: 10/318,026

(22) Filed: Dec. 13, 2002

(65) Prior Publication Data

US 2003/0111785 A1 Jun. 19, 2003

(30) Foreign Application Priority Data

Dec. 14, 2001 (JP) .......................... 2001-381493

(51) Int. Cl.[7] .............. B23Q 1/25; B25B 1/22
(52) U.S. Cl. .................. 269/73; 269/71; 198/750.7
(58) Field of Search ................. 269/73, 71, 55, 269/60, 289 R, 285; 310/12, 328; 384/15; 403/387; 198/750.7, 750, 341, 346.2, 468.9; 414/749, 750; 74/89.15; 108/137

(56) References Cited

U.S. PATENT DOCUMENTS 4,854,444 A * 8/1989 Iwamoto ............... 198/750.7
5,484,051 A * 1/1996 Nagai et al. ........... 198/750.7

* cited by examiner

Primary Examiner—Joseph J. Hail, III
Assistant Examiner—Daniel Shanley
(74) Attorney, Agent, or Firm—Pillsbury Winthrop LLP

(57) ABSTRACT

There is provided a linear guiding apparatus for a machine tool, the system having both of rapid characteristics of a rolling guide which does not deteriorate the precision of movement, and damping characteristics of a sliding guide which is hardly influenced by the load of a movable body. The feed guiding system includes: rolling guides 14a, 14b, 15a and 15b for guiding a horizontal movement while receiving the load of a movable body 12 on a bed 11; a sliding guide including sliding guide ways 16a and 16b, which extend in parallel to the rolling guides and in vertical directions, and slider portions 18a and 18b which slide on the sliding guide ways; and frictional force setting parts for changing the frictional force between the slider portions and the sliding guide ways, to set the magnitude of the frictional force.

5 Claims, 1 Drawing Sheet

LINEAR GUIDING APPARATUS FOR MACHINE TOOL

BACKGROUND OF THE INVENTION

1. Field of the Invention

The present invention generally relates to a linear guiding apparatus for a machine tool. More specifically, the invention relates to a linear guiding apparatus for guiding a feed motion of a movable body, such as a table of a machine tool, which is provided with a hybrid guide system such as a combination of a sliding guide and a rolling guide.

2. Description of Related Art

In machine tools, a linear guide for movable bodies, such as columns, spindle heads and tables, are generally classified under two categories, i.e., a sliding guide and a rolling guide. The sliding guide is in sliding contact with a guide way and acts as a damper element which absorbs kinetic energy of the movable body in consequence of kinetic friction. It is possible for the sliding guide to acquire damping characteristics of vibration which is the cause of high frequency vibration of the movable body. The rolling guide is in rolling contact with a guide way and does not act as a damper element, but the rolling guide possesses an advantage of reduced kinetic friction and is suitable for high speed feed motion.

Conventionally, the sliding guides are mainly used for movable bodies in machine tools. However, in recent years, rolling guides are widely current in the field of machine tools. Moreover, a hybrid type guiding system which is a combination of a sliding guide and a rolling guide has been developed. The hybrid type guiding system can change into the sliding guide so as to require damping characteristics in the case of a heavy cutting with a reduced speed feed motion. In the case of a high speed feed motion, the hybrid type guiding system can change into the rolling guide. Therefore, the hybrid type guiding system can enjoy advantages of both the sliding guide and the rolling guide. Such conventional hybrid type guiding systems are disclosed, for example, in Japanese Patent Laid-Open Nos. 1998-131634 and 2001-9655.

However, there are disadvantages common to conventional hybrid type guiding systems in that the hydraulic pressure control for obtaining required damping characteristics is complicated since the load of a movable body has a great influence on the damping characteristics of the sliding guide.

In addition, in the guiding system disclosed in Japanese Patent Laid-Open No. 1998-131634, a hydraulic cylinder is provided between a rolling guide and a movable body so as to be capable of changing a share of contribution by the sliding guide or the rolling guide. In a case where the rolling guide takes a large share of the guiding function to extend the stroke of the hydraulic cylinder, the moment rigidity of the hydraulic cylinder decreases, so that the rigidity between the movable body and the rolling guide decreases, thereby decreasing the precision of movement during a high speed feed motion. Similarly, in the guiding system disclosed in Japanese Patent Laid-Open No. 2001-9655, a rolling element of a rolling guide is provided between a guide rail and a sliding surface of a slider, and a hydraulic cylinder presses a brake shoe against the guide rail to increase its braking force to obtain damping characteristics. The deterioration of the precision of the guide rail cause by the friction of the brake shoe inevitably follow the deterioration of the precision of movement.

SUMMARY OF THE INVENTION

It is therefore an object of the present invention to eliminate the aforementioned problems and to provide a linear guiding apparatus for a machine tool, which achieves both of the rolling guide with high speed feed ability without deteriorating the precision of movement and a sliding guide with damping characteristics without being influenced by the load of a movable body.

In order to accomplish the aforementioned and other objects, according to one aspect of the present invention, there is provided a linear guiding apparatus combining a rolling guide with a sliding guide for guiding the movement of a movable body on a bed of a machine tool, said apparatus comprising a rolling guide means configured to guide the movable body in the horizontal direction while supporting a load of the movable body on the bed, a sliding guide means having a sliding guide way extending in parallel to the rolling guide means and the vertical plane, and a slider member having a slide plate configured to slide on the sliding guide way; and frictional force generating means configured to press the slide plate against the sliding guide way.

According to this linear guiding apparatus, the load of the movable body is not applied to the sliding guide way, so that it is possible to add damping characteristics to the sliding guide without being influence by the load, thereby coping with both the rolling guide and the sliding guide.

In the above described linear guiding apparatus, the frictional force generating means may be build in the slider member, and comprises an actuator for pressing the sliding plate against the sliding guide way, and control means for controlling a pressing force of the actuator.

According to this linear guiding apparatus, when a heavy cutting feed is carried out, the pressing force of the actuator can be increased to enhance the damping characteristics of the sliding guide way, and when a rapid feed or a light cutting feed is carried out, the pressing force can be decreased to reduce the influence of the sliding guide way to carry out a guide suitable for the rapid feed.

In the above described feed guiding system, said sliding guide means may be provided with sliding guide ways formed on both sides of the bed so as to be perpendicular to a movable body mounting surface on the bed, and a pair of sliding members mounted on the both side of the movable body, each of said sliding member having the sliding plate configured to slide on the sliding guide ways.

According to this linear guiding apparatus, nothing is provided between the movable body and the rolling guide, so that it is possible to cope with both the rolling guide and the sliding guide without deteriorating the precision of movement of the rolling guide.

DETAILED DESCRIPTION OF A PREFERRED EMBODIMENT OF THE INVENTION

Figure 1:
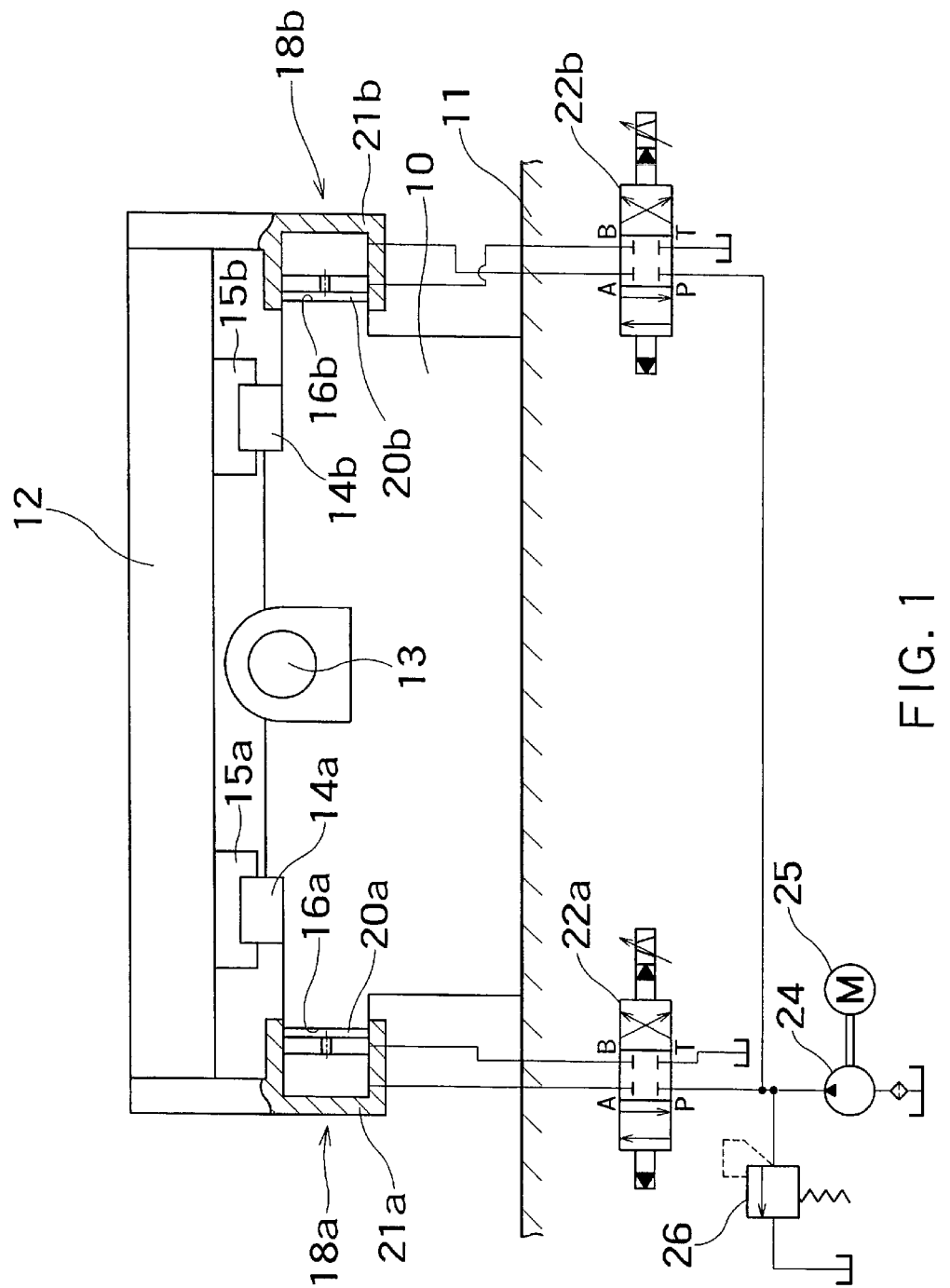
FIG. 1 is an illustration for explaining the construction of a preferred embodiment of a feed guiding system for a machine tool according to the present invention.

Referring now to the accompanying drawing, the preferred embodiment of a linear guiding apparatus for a machine tool according to the present invention will be described below.

FIG. 1 shows a guide for feeding a table in a machining center to which the present invention is applied. In this FIG. 1, the table is shown from the feed direction of the table.

In FIG. 1, reference number 10 denotes a bed. The bed 10 is fixedly mounted on a base 11. A table 12 serving as a movable body is installed on the bed 10. Reference number 13 denotes a ball screw for feeding the table 12.

Guide rails 14a and 14b on the bed 12 are parallel to the axis of the ball screw 13. Rolling guide units 15a and 15b having rollers which roll along the guide rails 14a and 14b are mounted on the bottom side of the table 12.

As a linear guiding mechanism for feeding the table 12, the above described rolling guide is combined with the following sliding guide.

Sliding guide ways 16a and 16b are formed on shoulder portions on both sides of the bed 10, so as to extend in parallel to the axis of the ball screw 13. The sliding guide ways 16a and 16b have guide surfaces rising up parallel to the vertical plane.

On the other hand, the table 12 carries slider members 18a and 18b so as to extend vertically downwards on both of right and left sides of the table 12. The slider members 18a and 18b include sliding plates 20a and 20b, respectively. The sliding plates 20a and 20b are connected directly to hydraulic cylinders 21a and 21b, respectively. The hydraulic cylinders 21a and 21b can press the sliding plates 20a and 20b perpendicular to the sliding guide ways 16a and 16b, respectively. Thus, a desired frictional force in proportion to the pressing force is produced between the sliding members 20a, 20b and the sliding guide ways 16a, 16b, so that it is possible to add required damping characteristics to the sliding guide.

In this preferred embodiment, pressure control servo valves 22a and 22b are configured to control a pressure of hydraulic fluid to a instructed value, which is supplied to the hydraulic cylinders 21a and 21b, it is possible to keep the frictional force at a desired value. That is, the hydraulic fluid discharged from a hydraulic pump 24 is supplied to the hydraulic cylinders 21a and 21b by way of the pressure control servo valves 22a and 22b, respectively. When spools in each of the pressure control servo valves 22a and 22b is positioned at a position where a port P is communicated with a port A, the hydraulic fluid is supplied to cylinder chamber of the head end, causing the sliding plates 20a and 20b to press against the sliding guide ways 16a and 16b, respectively. At this time, each of the pressure control servo valves 22a and 22b keeps up the pressure of the hydraulic fluid to be a desired pressure instructed by a controller (not shown). On the other hand, in a case of table feed motion accompanied by no cutting process, the position of the servo pressure control valves 22a,22b is changed so that the port P is communicated with a port B to allow the hydraulic fluid to be supplied to a cylinder chamber of the rod end. Consequently, the sliding plates 20a and 20b completely lost touch with the sliding guide ways 16a and 16b, respectively. In FIG. 1, reference number 25 denotes a motor for driving the hydraulic pump 24, and reference number 26 denotes a relief valve.

With this construction, the function of the linear guiding apparatus for a machine tool in this preferred embodiment will be described below.

In this preferred embodiment, cutting processes are distinguished between a heavy cutting process and a light cutting process. The pressure of the hydraulic fluid supplied to the hydraulic cylinders 21a and 21b of the slider members 18a, 18b is set at Pb during the light cutting condition, which is lower than the pressure Pb set during the heavy cutting condition.

Therefore, by setting pressure of the hydraulic fluid supplied from the pressure control servo valves 22a and 22b to the head end cylinder chambers of the hydraulic cylinders 21a and 21b to be the higher pressure Pa, a frictional force in proportion to a value of Pa is generated between the sliding plates 20a, 20b and the sliding guide ways 16a, 16b, so that it is possible for the sliding guide to obtain higher damping characteristics enough to appropriately absorb vibrations during the heavy cutting process.

When feed motion efficiency of the table 12 are required in addition to the damping characteristics during light cutting process, the pressure of the hydraulic fluid is set to be the lower value of Pa. Consequently, the frictional force between the sliding plates 20a, 20b and the sliding guide ways 16a, 16b decreases, so that the table 12 moves with improvements of the feed motion efficiency and the precision of movement. Moreover, as nothing is provided between the table 12 and the rolling guide consisting of the guide rails 14a, 14b and the rolling guide units 15a, 15b, the rolling guide is incompatible with the sliding guide without deteriorating the precision of movement characteristics of the rolling guide.

Thus, it is possible to change the damping characteristics added to the sliding guide in accordance with cutting conditions, and it is possible to add damping characteristics without being influenced by the load of the table 12 since the sliding guide ways 16a and 16b extend parallel to the vertical plane. Therefore, if only the coefficients of friction of the sliding guide ways 16a and 16b, and the force of the hydraulic cylinders 21a and 21b pressing the sliding plates 20a and 20b against the sliding guide ways 16a and 16b, i.e., the pressure of the hydraulic fluid, are controlled, it is possible to adjust damping characteristics and simplify the control mechanism.

When the table 12 is moved without accompanying cutting process, the position of the pressure control servo valves 22a and 22b are changed so that the port P is communicated with the port B, the sliding plates 20a and 20b lose touch with the sliding guide ways 16a and 16b. Consequently, the table 12 is guided by the rolling guide alone. Therefore, suitable condition for the high speed feed motion of the table 12 can be realized by getting the maximum ability in the precise movement and rigidity of the rolling guide.

As described above, according to the present invention, the linear guide apparatus can have both of high speed feed ability of the rolling guide without deteriorating the precision of movement and damping characteristics of the sliding guide without being influenced by the load of the movable body.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A linear guiding apparatus having a combination of a rolling guide with a sliding guide for guiding the movement of a movable body on a bed of a machine tool, said apparatus comprising:
   a rolling guide means configured to guide the movable body in the horizontal direction while supporting a load of the movable body on the bed;
   a sliding guide means having a sliding guide way extending in parallel to the rolling guide means and the vertical plane, and a slider member having a slide plate configured to slide on the sliding guide way; and a frictional force generating means configured to press the slide plate against the sliding guide way.

2. A linear guiding apparatus according to claim 1, wherein said frictional force generating means includes a frictional force setting means for changing the frictional force between the slider member and the sliding guide way to maintain the frictional force at a predetermined value.

3. A linear guiding apparatus according to claim 1, wherein said frictional force generating means is build in the slider member, and comprises an actuator for pressing the sliding plate against the sliding guide way, and control means for controlling a pressing force of the actuator.

4. A linear guiding apparatus according to claim 1, wherein said sliding guide means is provided with sliding guide ways formed on both sides of the bed so as to be perpendicular to a movable body mounting surface on the bed and a pair of sliding members mounted on the both side of the movable body, each of said sliding member having the sliding plate configured to slide on the sliding guide ways.

5. A linear guiding apparatus according to claim 1, wherein said movable body is a table mounted movably on the bed of the machine tool.

* * * * *